United States Patent [19]
Noehren et al.

[11] Patent Number: 5,263,821
[45] Date of Patent: Nov. 23, 1993

[54] MID-BEAM JOINTED RECONFIGURABLE BEARINGLESS MAIN ROTOR ASSEMBLY

[75] Inventors: William L. Noehren, Trumbull; Leonard J. Doolin, Southbury; Stephen V. Poulin, Stratford, all of Conn.

[73] Assignee: United Technologies Corporation, Hartford, Conn.

[21] Appl. No.: 749,739

[22] Filed: Aug. 26, 1991

Related U.S. Application Data

[63] Continuation-in-part of Ser. No. 641,237, Jan. 15, 1991.

[51] Int. Cl.$^5$ .............................................. B64C 27/33
[52] U.S. Cl. ................................. 416/134 A; 416/141
[58] Field of Search ............... 416/134 R, 134 A, 141, 416/140

[56] References Cited

U.S. PATENT DOCUMENTS

| | | | |
|---|---|---|---|
| 4,349,316 | 9/1982 | Hughes et al. | 416/134 A |
| 4,496,284 | 1/1985 | Watson | 416/141 |
| 4,690,615 | 9/1987 | Kuntze-Fechner et al. | 416/134 A |
| 4,975,021 | 12/1990 | Wagner et al. | 416/134 A |
| 5,091,029 | 2/1992 | Davis et al. | 416/134 A |

*Primary Examiner*—John T. Kwon
*Attorney, Agent, or Firm*—Terrance J. Radke

[57] ABSTRACT

A mid-beam jointed reconfigurable bearingless main rotor (BMR) assembly that includes reconfiguration joints that facilitate BMR assembly reconfiguration by main rotor blade removal or folding to reduce the structural envelope of a helicopter for rapid deployment, routine transport, and/or storage. The BMR assembly comprises a rotor hub structure that includes a plurality of radially extending flexbeams, combinations of torsion flexure members and main rotor blades disposed in combination with corresponding flexbeams, and torque tube subassemblies disposed in combination with corresponding flexbeams and torsion flexure member, main rotor blade combinations. Each reconfiguration joint is formed by a combination of an outboard joint segment of a flexbeam and an inboard joint segment of the corresponding torsion flexure member. The rotor hub structure is fabricated so that the configuration joints are purposefully located at radial stations that are subjected to minimal flapwise loading, which for aerodynamic efficiency and manufacturing considerations should not exceed about fifteen percent of the overall span of the BMR assembly. The torque tube subassemblies are fabricated to provide access to the respective reconfiguration joints. For reconfiguration by the removal technique, each torque tube subassembly includes one or more access panels. For reconfiguration by the folding technique, each torque tube subassembly includes a removable splice tube.

7 Claims, 9 Drawing Sheets

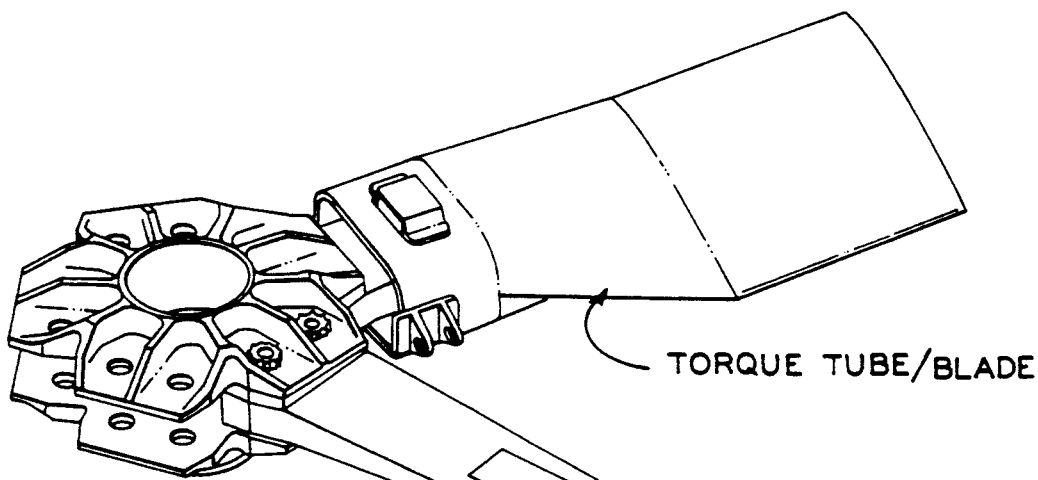
FIG. 1
PRIOR ART
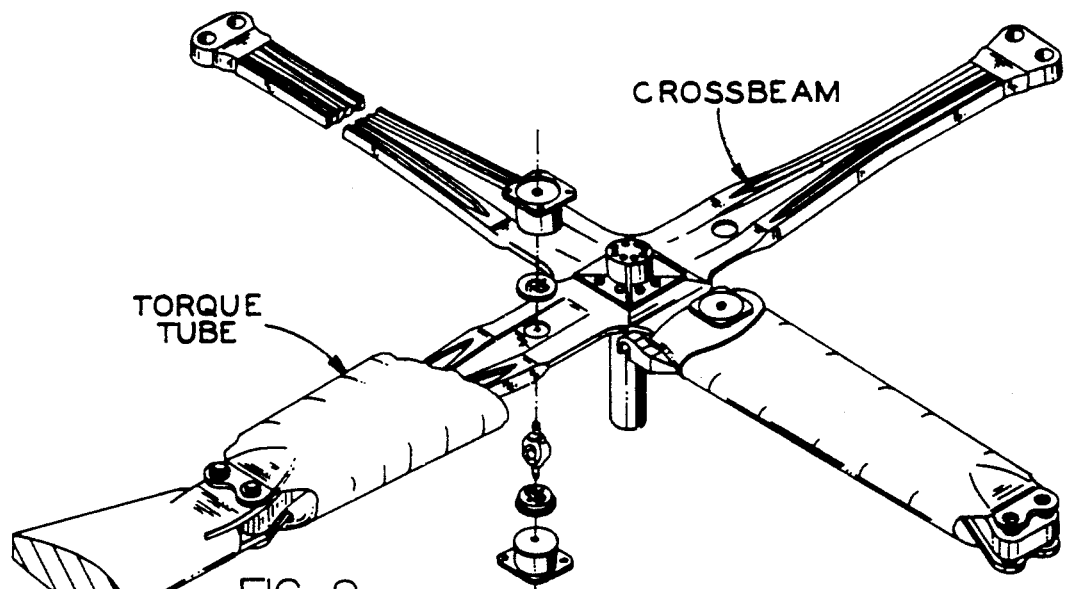
FIG. 2
PRIOR ART

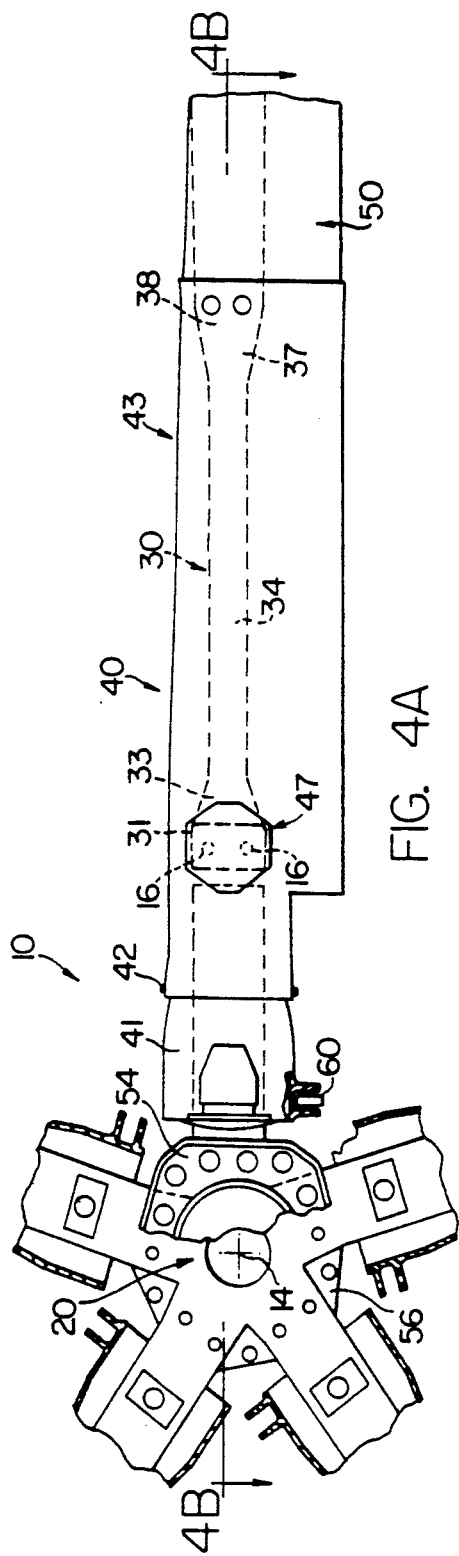
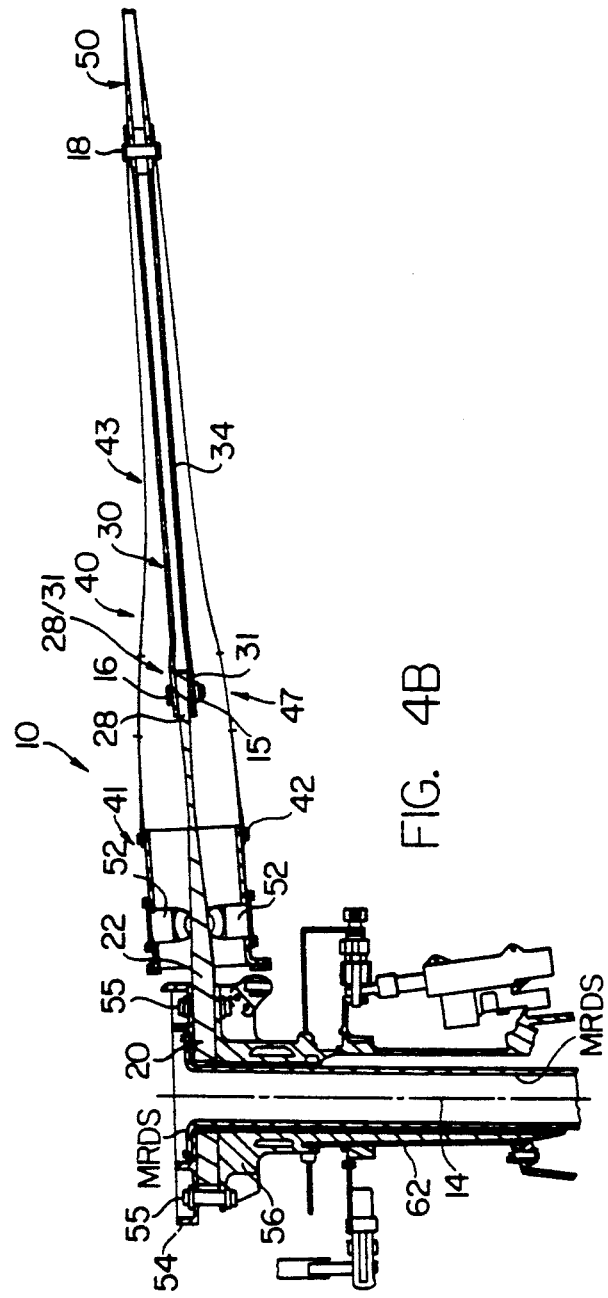
FIG. 4A
FIG. 4B

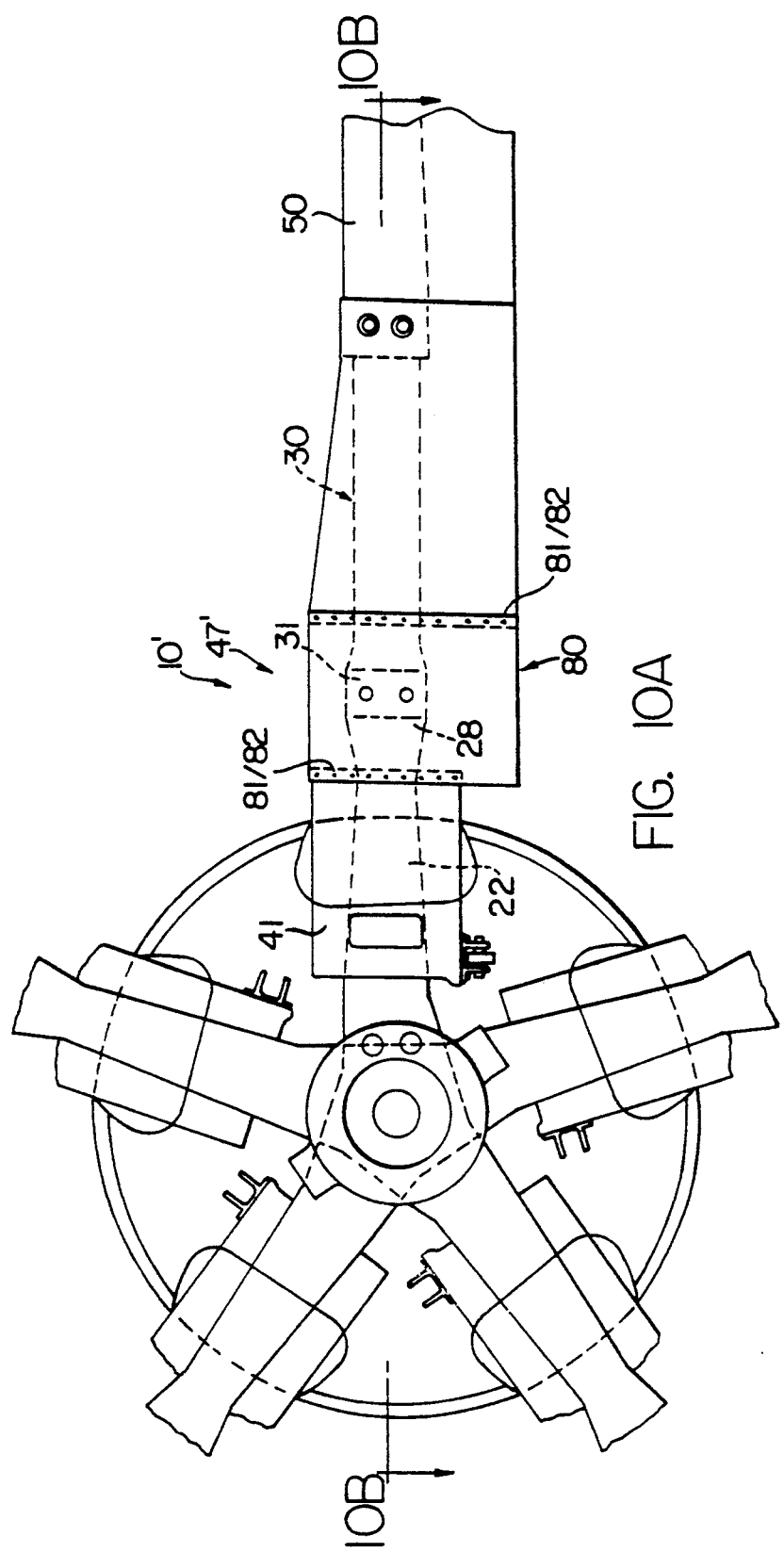

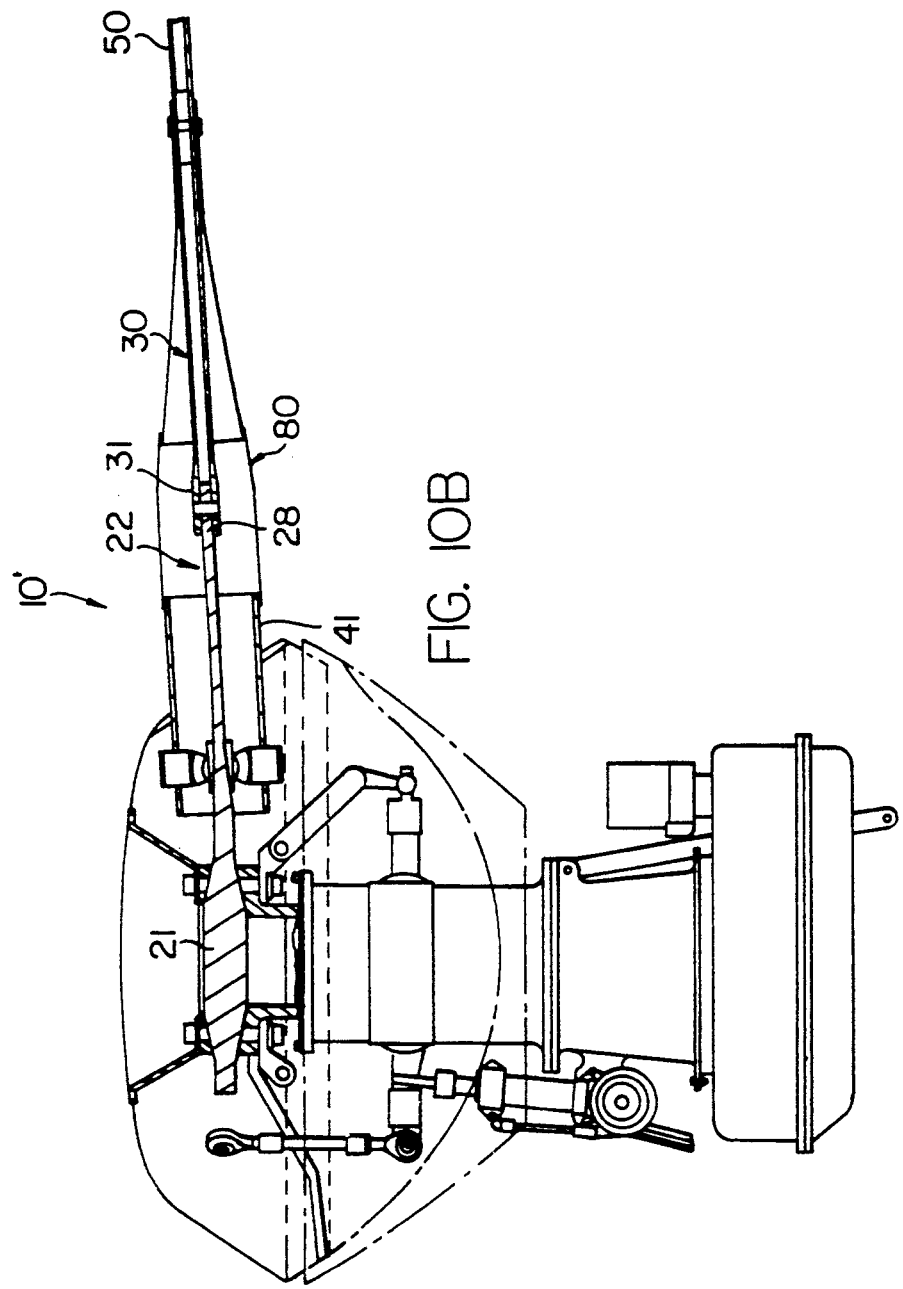

MID-BEAM JOINTED RECONFIGURABLE BEARINGLESS MAIN ROTOR ASSEMBLY

The Government has rights in this invention pursuant to Contract No. DAAJ09-89-C-A002 awarded by the Department of the Army.

RELATED APPLICATION

The present application is a continuation-in-part of commonly-owned, co-pending U.S. patent application Ser. No. 07/641,237, filed Jan. 15, 1991, entitled A UNITARY, MULTI-LEGGED HELICOPTER ROTOR FLEXBEAM MADE SOLELY OF COMPOSITE MATERIALS AND THE METHOD OF MANUFACTURING SAME.

The present application is also related to commonly-owned, co-pending U.S. patent application Ser. No. 07/751,272, filed Aug. 28, 1991, entitled BEARINGLESS MAIN ROTOR ASSEMBLY TORQUE TUBE.

TECHNICAL FIELD

The present invention relates to bearingless main rotor assemblies for helicopters, and more particularly, to a mid-beam jointed reconfigurable bearingless main rotor assembly that facilitates main rotor assembly reconfiguration, i.e., main rotor blade removal or folding, to reduce the structural envelope of the helicopter for rapid deployment, routine transport, and/or storage.

BACKGROUND OF THE INVENTION

A helicopter main rotor assembly is subjected to various aerodynamic, inertial, and centrifugal forces and moments during flight operations and to main rotor blade static droop when the helicopter powerplant is shut down. The main rotor assembly is designed to accommodate such forces and moments through the structural and functional characteristics of the various structural elements comprising the main rotor assembly. Of particular concern in designing a helicopter main rotor assembly are centrifugal loading (due to rotation of the rotor blades), torsional loading (due to pilot pitch control inputs), flapwise loading (due to out-of-plane blade motions, i.e., flapping), and edgewise or chordwise loading (due to in-plane blade motions, i.e., lead or lag).

Many prior art main rotor assemblies (older helicopters or those at the lower end of the cost spectrum) utilize mechanical mechanisms to react centrifugal, pitch, flapping, and/or lead-lag loads developed in the main rotor assembly. Blade attachment bolts have been utilized to transfer centrifugal loads from the main rotor blades to the main rotor hub structure. Mechanical linkages have been utilized to input pilot pitch changes to the main rotor blades. Bearings in the form of rolling element or elastomeric bearings have been utilized in mechanical hinges to react the pitch, flapping and lead-lag motions experienced by the main rotor blades.

Offset flapping and lead-lag hinges have been incorporated in main rotor assemblies to react flapping and lead-lag loads, respectively, of the main rotor blades. While such hinges have generally functioned in a satisfactory manner, the structural configurations of such hinges increase the mechanical complexity and weight of the main rotor assembly due to the load carrying capability required of such hinges.

The increased reliability, adaptability, reproducibility, and flexibility available from composite structures, due to the advancements in composite materials and/or fabrication techniques, has led to the increased use of composite materials in helicopter main rotor assemblies. Individual composite structural elements may be designed and fabricated for main rotor assemblies to react a plurality of the main rotor assembly loading effects described hereinabove, thereby reducing the number of mechanical mechanisms required in the main rotor assembly to react centrifugal, pitch, flapwise, and/or chordwise loads and providing a concomitant reduction in the overall weight and complexity of the main rotor assembly. The elimination of the offset flapping and lead-lag hinges in main rotor assemblies through the use of composite structural members has resulted in "bearingless" main rotor assemblies. The composite structural members of a bearingless main rotor assembly may be described as "flexbeams" or "crossbeams" due to the structural and/or functional characteristics of such composite structural members.

An exemplary composite crossbeam of a bearingless main rotor assembly is described in U.S. Pat. No. 4,746,272. The integral composite crossbeam described in the '272 patent is designed and fabricated to segregate the flapwise shear strain from the torsional shear strain to improve the fatigue performance of the crossbeam. An inboard flexure portion of each leg of the integral crossbeam is comprised of unidirectional composite fibers overwound or wrapped with a $+/-45°$ composite wrap that forces torsional deflections outboard of the inboard flexure portion. The inboard flexure portion, therefore, reacts flapwise loads while an outboard flexure portion of each leg of the integral crossbeam reacts chordwise and torsion loads. The composite crossbeam provides an integral mechanical interface between opposed main rotor blades which accommodates centrifugal loading experienced by the opposed main rotor blades.

Representative examples of the use of composite structures in bearingless main rotor assemblies are illustrated in FIGS. 1, 2. FIG. 1 illustrates a bearingless main rotor assembly of the type utilized on MBB 108 helicopters wherein individual composite flexbeams are mechanically coupled to the main rotor assembly hub by vertical pins. Centrifugal loads of the main rotor blades are reacted by the bolted connections of the vertical pins. The composite flexbeams are designed and fabricated to react the flapwise and chordwise loads experienced by the main rotor blades as well as the torsion loads produced by the pitch control input mechanisms. Each flexbeam includes an outboard joint that provides a mechanical interconnection for the inboard end of a main rotor blade spar and the outboard end of a torque tube (one element of the pitch control input mechanism).

FIG. 2 illustrates a bearingless main rotor assembly of the type utilized on Bell 680 helicopters wherein integral composite crossbeams are incorporated as part of the hub configuration of the main rotor assembly. As with the flexbeams illustrated in FIG. 1, the integral composite crossbeams are designed and fabricated to react the flapwise and chordwise loads experienced by the main rotor blades as well as the torsion loads produced by the pitch control input mechanism.

Strategic and tactical considerations in the military utilization of helicopters has led to a requirement for helicopters having main rotor assemblies that may be readily reconfigured for rapid deployment, routine transport, and/or storage through reduction in the lateral/longitudinal structural envelope of the helicopter. Reconfiguration may be accomplished by main rotor blade removal or main rotor blade folding. While the bearingless main rotor assemblies illustrated in FIGS. 1, 2 may be reconfigured to reduce the structural envelope of the helicopter, each of the illustrated main rotor assembly configurations has disadvantages that makes them less than optimally suited for main rotor assembly reconfiguration.

The main rotor assembly depicted in FIG. 1 is representative of an inboard reconfiguration joint. To reconfigure such a main rotor assembly by the removal technique requires time and labor not only for the removal of the vertical hinge bolt connections, but also the disconnection of the pitch control input mechanism for each main rotor blade. Each flexbeam, torque tube, main rotor blade combination may then be detached from the hub structure to provide a helicopter having a significantly reduced structural envelope. Reconfiguring the helicopter for flight operations, however, is also a time consuming and labor intensive procedure. Not only must the flexbeam, torque tube, main rotor blade combinations and pitch control input mechanisms be reconnected, but the reassembled main rotor assembly requires a check-out flight before the resumption of normal flight operations.

The main rotor assembly of FIG. 1 may also be reconfigured by the folding technique by removing one of the connection bolts from each of the vertical hinges and folding the respective flexbeam, torque tube, main rotor blade combination about the remaining bolted connection. In addition to the flapwise loads that are reacted at the vertical hinge positions, the bolted hinge connections must also be designed to support the weight of the flexbeam, torque tube, main rotor blade combination during the folding operation, which typically necessitates a stronger (and heavier) vertical hinge configuration than would otherwise be required. Furthermore, the configuration of the main rotor assembly hub structure, i.e., the proximity of adjacent vertical hinges, presents clearance problems in folding adjacent flexbeam, torque tube, main rotor blade combinations.

Based upon the foregoing disclosure, it may be appreciated that a main rotor assembly having an inboard reconfiguration joint is not eminently suited for reconfiguration by either the blade removal or blade folding techniques.

The bearingless main rotor assembly depicted in FIG. 2 is representative of an outboard reconfiguration joint. While this type of main rotor assembly configuration may be reconfigured by either the removal or the folding technique, the spatial location of the outboard reconfiguration joint makes this type of bearingless main rotor assembly not particularly well-suited for either type of reconfiguration.

To accommodate the various main rotor blade loadings described hereinabove, in particular, the torsion loading from the pitch control input mechanisms, the integral composite crossbeams (as well as the integral composite flexbeams of FIG. 1) extend outwardly from the rotor hub structure a significant distance radially. This spatial location of the outboard reconfiguration joint makes access to the joint for the reconfiguration procedure exceedingly difficult. The outboard reconfiguration joints of the integral crossbeam are situated in the aerodynamic flowpath of the main rotor assembly (at about the 25% station of the rotor radius span) such that the shape of the reconfiguration joint and/or joint access panel causes an increase in induced drag. In addition, to accommodate reconfiguration by means of the folding technique, the outboard reconfiguration joint must be upscaled in size to provide sufficient structural strength for blade folding about one connection bolt. Such an outboard reconfiguration joint, even if aerodynamically configured, acts as a discontinuity in the aerodynamic flowpath, the net result being that the shroud causes an increase in induced aerodynamic drag for such a bearingless main rotor assembly.

A need exists for a helicopter main rotor assembly that includes reconfiguration joints that facilitate reconfiguration of the helicopter for rapid deployment, routine transport, and/or storage of the helicopter through reduction in the lateral/longitudinal structural envelope of the helicopter. The reconfiguration joint should be readily integrable as elements of the composite components comprising the main rotor assembly that are functional to react the centrifugal, flapwise, chordwise, and torsional loads of the main rotor assembly. Further, the reconfiguration joint should be readily accessible to maintenance personnel and should facilitate an optimized reconfiguration procedure in terms of time and labor.

SUMMARY OF THE INVENTION

One object of the present invention is to provide a helicopter main rotor assembly that is readily reconfigurable to reduce the lateral/longitudinal structural envelope of the helicopter to facilitate rapid deployment, routine transport, and/or storage thereof.

Another object of the present invention is to provide a helicopter main rotor assembly that is readily reconfigurable by a blade removal technique to reduce the lateral/longitudinal structural envelope of the helicopter to facilitate rapid deployment, routine transport, and/or storage thereof.

A further object of the present invention is to provide a helicopter main rotor assembly that is readily reconfigurable by a blade folding technique to reduce the lateral/longitudinal structural envelope of the helicopter to facilitate rapid deployment, routine transport, and/or storage thereof.

Still another object of the present invention is to provide a helicopter main rotor assembly that includes reconfiguration joints formed by the outboard joint segments of the flexbeams of the main rotor assembly hub structure and the inboard joint segments of the torsion flexure members.

Yet another object of the present invention is to provide a helicopter main rotor assembly having the reconfiguration joints located at radial stations that are subjected to minimal flapwise loading.

Still a further object of the present invention is to provide a helicopter main rotor assembly wherein the reconfiguration joints are located at radial stations that are about fifteen percent or less of the span of the main rotor assembly.

Yet a further object of the present invention is to provide a helicopter main rotor assembly that includes torque tube subassemblies having means for accessing the reconfiguration joints.

One more object of the present invention is to provide a helicopter main rotor assembly wherein the torque tube subassembly means for accessing the reconfiguration joints comprises access panel(s) in the ventral and/or dorsal walls of the torque tube.

Still one more object of the present invention is to provide a helicopter main rotor assembly wherein the torque tube subassembly means for accessing the reconfiguration joints comprises a removable splice tube.

Yet one more object of the present invention is to provide a helicopter main rotor assembly having torsion flexure members that are integral extensions of the composite spars of the main rotor blades.

Still one further object of the present invention is to provide a helicopter main rotor assembly wherein the torsion flexure members comprise twin "C" beams providing low torsional stiffness, minimal chordwise stiffness, and enhanced ballistic survivability.

These and other objects are achieved by a mid-beam jointed reconfigurable bearingless main rotor (BMR) assembly according to the present invention wherein bearings have been eliminated from centrifugal loadpaths, blade flapwise and chordwise loads are reacted through out-of-plane and in-plane flexure of integral composite flexbeams, and torsional loads are accommodated by means of composite torsion flexure members that provide the interactive interface structure between the composite flexbeams and corresponding main rotor blades. The reconfiguration joint of the BMR assembly of the present invention facilitates relatively rapid and easy reconfiguration, i.e., removal or folding, of the helicopter blades to reduce the lateral/longitudinal structural envelope of the helicopter for rapid deployment, routine transport, and/or storage thereof.

The mid-beam jointed reconfigurable BMR assembly includes a hub structure coaxially disposed with respect to the axis of rotation of the BMR assembly, torsion flexure members and main rotor blades disposed in combination with the hub structure, torque tube subassemblies disposed in combination with the hub structure and respective torsion flexure member, main rotor blade combinations, snubber dampers disposed in combination with the hub structure and the torque tube subassemblies, an upper clamp plate, a lower hub plate, a swashplate subassembly, pitch control rods, and a static rotor mast. The swashplate subassembly in combination with the pitch control rods implements pitch input changes commanded by the pilot in the main rotor blades via the torque tube subassemblies.

The snubber dampers are operative to maintain the flatwise position of the torque tube subassemblies relative to respective flexbeams of the hub structure. The snubber dampers also provide lead-lag damping to stabilized the BMR assembly. Two snubber dampers are utilized for each main rotor blade of the BMR assembly, each snubber damper being disposed intermediate corresponding surfaces of a respective flexbeam and torque tube subassembly. The upper clamp plate is operative to secure the hub structure to the lower hub plate by means of bolts passing through the upper clamp plate, the hub structure, and the lower hub plate. The upper clamp plate is secured in combination to the main rotor drive shaft to transmit torque therefrom to the hub structure.

The hub structure is preferably a unitary composite structure that includes a central hub portion having a central aperture coaxially orientated with respect to the axis of rotation and plurality of flexbeams or legs equidistantly spaced circumferentially about the central hub portion and extending radially outwardly therefrom. Each flexbeam includes a constant thickness inboard segment, an inboard tapered segment, an intermediate segment of constant minimum thickness, an outboard tapered segment, and a constant thickness joint segment. Each joint segment includes bolt holes for integrating respective torsion flexure member, main rotor blade combinations with the hub structure.

The hub structure is operative to react radial loads resulting from the main rotor blade centrifugal forces. The configuration of the flexbeams is stress-optimized to react flatwise and chordwise loadings due to aerodynamic forces experienced by the main rotor blades. The intermediate segments of constant minimum thickness are comprised primarily of unidirectional, high tensile strength fiber plies that react most flatwise and some chordwise loading.

The joint segments of the hub structure of the BMR assembly that comprise the reconfiguration joints are located a predetermined radial spanwise distance from the axis of rotation. The midpoint of each joint segment is purposefully located at the radial spanwise station that is subjected to only about 5% of the flapwise bending loads (with respect to the hub plates). This location of the joint segments minimizes the structural strength, i.e., weight, required of the joint segments since the minimal flapwise loading at this location allows fabrication of lighter weight joint segments. The location of the joint segment of a preferred embodiment of the BMR assembly corresponds to about a 15% spanwise radial station as opposed to prior art outboard reconfiguration joints which are located at about a 25% spanwise radial station.

Manufacturing constraints and logistical considerations preclude extending the joint segments of the hub structure beyond a spanwise location greater than about 15% of the overall BMR assembly span. Exceeding the 15% spanwise location would result in a main rotor assembly that could not be reconfigured for rapid deployment or transport in a C-130 or C-141 aircraft, i.e., the overall diameter or lateral/longitudinal structural envelope of the helicopter rotor hub structure would not be compatible with the cargo bay dimensions of the aircraft. In addition, exceeding the 15% spanwise location would result in a main rotor assembly having functionally degraded aerodynamic characteristics. The torsion flexure members would have a decreased span length that would impair reaction to torsion loads and/or the main rotor blades would be aerodynamically shortened, which would degrade the overall aerodynamic performance of the main rotor assembly.

For the preferred embodiment of the BMR assembly, each torsion flexure member is an integral extension of the composite spar of the corresponding main rotor blade, and comprises approximately seventy-five percent fiber plies having a 0° fiber orientation and approximately twenty-five percent biased fiber plies, e.g., +/−45° fiber orientation. Forming the torsion flexure members as integral extensions of the main rotor blade composite spars simplifies the manufacturing process for the torsion flexure members since each torsion flexure member is comprised of unidirectional fiber plys that extend from the outboard end of the main rotor blade composite spar to the inboard end of the torsion flexure member. While the preferred embodiment of the torsion flexure member is an integral extension of the composite spar of the corresponding main rotor blade, the torsion flexure members may alternatively be fabricated as independent composite structural members. Such torsion flexure members may be integrated in combination with the respective main rotor blades utilizing interface techniques known to those skilled in the art.

Each torsion flexure member comprises a flexbeam-to-blade joint segment, a first taper segment, a torsion segment, a second taper segment, and a torque tube joint segment. Each flexbeam-to-blade joint segment has a clevis-shaped configuration that complements the configuration of the constant thickness joint segments of the flexbeams. Each torsion flexure member, main rotor blade combination is secured to the respective flexbeam by sleeving the flexbeam-to-blade joint segment onto the constant thickness joint segment and inserting attachment bolts through respective bolt holes. The constant thickness joint segment, flexbeam-to-blade joint segment combination comprises the reconfiguration joint for the mid-beam jointed reconfigurable BMR assembly of the present invention.

The torsion segment of the torsion flexure member functions as the reaction element for the torsion loads of the BMR assembly. The preferred configuration for the torsion segment of the preferred embodiment of the BMR assembly is a twin "C" composite configuration. The elliptical configuration of the integral extension of the main rotor blade composite spar that forms the torsion flexure member is "sliced" horizontally to form twin "C" beams that comprise the torsion segment. The twin "C" composite torsion segment has a low torsional stiffness and functions as a natural torsion section that experiences reduced torsion induced strains due to the twin "C" configuration. In addition, the twin "C" composite torsion segment provides minimum chordwise stiffness and enhanced ballistic survivability and fail safety due to the redundant load paths provided by the twin "C" beams.

As alternative embodiments, the composite torsion section may be fabricated in other configurations that exhibit low torsional stiffness such as a cruciform configuration, a back-to-back "C" configuration, a channel configuration, an "H" configuration, or a triple "H" configuration. These alternative embodiments may be more appropriate for utilization in BMR assemblies wherein the torsion flexure members are manufactured as independent composite structural members, and subsequently integrated in combination with corresponding main rotor blades.

The primary function of the torque tube subassembly is the transmission of pitch inputs from the corresponding pitch control rod to the corresponding main rotor blade. To accomplish this function, the torque tube subassembly is structurally configured to have a high torsional stiffness that provides precise pitch control displacement of the respective main rotor blade in response to inputs from the corresponding pitch control rod. In addition, the torque tube subassembly for the BMR assembly of the present invention is specially configured to provide means for readily accessing the reconfiguration joint of the BMR assembly.

One embodiment of a torque tube subassembly is a hybrid metallic, composite structure that includes a metallic horn segment and a composite torque tube. The horn segment integrates the functions of the inboard torque tube subassembly, the pitch control rod attachment lugs, snubber damper attachment points, and droop/flap stop surfaces into a single structure. Pitch inputs from the respective pitch control rod are mechanically coupled to the horn segment. The outboard end of the horn segment is rigidly secured in combination with the composite torque tube by conventional means.

The composite torque tube includes an inboard segment, an intermediate segment, and an outboard segment configured for securing the torque tube subassembly in combination with the respective torsion flexure member, main rotor blade combination. This combination of elements effectuates the transfer of pitch inputs from the torque tube subassembly to the corresponding main rotor blade.

The composite torque tube also includes means for accessing the reconfiguration joint to implement the reconfiguration procedure. The access means for the preferred embodiment of the BMR assembly includes lower and/or upper access apertures in corresponding walls of the composite torque tube in alignment with the reconfiguration joint, and access cover panels that are detachably secured over the corresponding access apertures.

Each composite torque tube is an integral composite structure comprised of multiple layers of fibrous tension-wound filaments, wraps, and/or laminates wherein the shape and fiber orientations thereof vary along the span length of the composite torque tube to provide a composite torque tube having a configuration based upon the torsional stiffness, buckling strength, and fatigue strength design constraints of the BMR assembly. The inboard and outboard segments of the composite torque tube are of generally constant oval shape and are thicker in cross section than the intermediate segment. The inboard and outboard segments are formed of tension-wound filaments and fibrous wraps and laminates having 0°, +/−45°, and/or 90° fiber orientations to react hoop stresses and connection loadings.

The intermediate segment has a constant wall thickness and is of oval cross section that is tapered in the spanwise direction, inboard to outboard. The intermediate segment may be formed with tension-wound filaments having a +/−45° fiber orientation that provides maximum torsional stiffness. Alternatively, the intermediate segment may be formed with fibrous laminates having a 0° fiber orientation and tension-wound filaments having a +/−45° fiber orientation.

Another embodiment of a torque tube subassembly which has particular utility in the preferred embodiment of the BMR assembly of the present invention is a totally composite torque tube subassembly that is optimally fabricated to meet the torsional stiffness, fatigue strength, and buckling strength design constraints of the BMR assembly at minimal weight. The all-composite torque tube subassembly includes a strengthened inboard section for mechanically coupling the torque tube subassembly in combination with the hub structure as well as providing attachment points for the snubber dampers and the pitch control rod, a strengthened outboard section for mechanically coupling the torque tube subassembly in combination with the corresponding torsion flexure member, main rotor blade combination, and an intermediate section that is operative to accommodate the pitch, flapwise, and/or edgewise loads acting on the BMR assembly.

The inboard section is optimally fabricated to include tension-wound filaments having a 90° fiber orientation to react induced hoop stresses and fibrous laminates having a +/−45° fiber orientation to accommodate bearing loads. The outboard section is optimally fabricated to include fibrous laminates having a 0° fiber orientation to accommodate connection loading and fibrous laminates having a +/−45° fiber orientation to accommodating load transfers between the torque tube subassembly and the hub structure.

The intermediate section has a constant wall thickness formed from continuous filament windings having a predetermined fiber orientation within the range of about +/−18° to about +/−40° and/or a range of about +/−26° to about +/−35°. The intermediate section of the torque tube subassembly is preferably formed from continuous filament windings having a +/−35° fiber orientation to provide an intermediate section having minimal torque tube wall thickness, i.e., a torque tube subassembly having minimal overall unit weight. Continuous filament windings having the +/−35° fiber orientation in the intermediate section can be smoothly transitioned to provide fibrous layers having a +/−45° fiber orientation in the inboard section to enhance the structural strength thereof without the incorporation of ancillary fibrous layers having the +/−45° fiber orientation.

The mid-beam jointed reconfigurable BMR assembly of the present invention is adaptable for use with a wide variety of main rotor blade configurations. As one skilled in the art will appreciate, the specific aerodynamic configuration of the main rotor blade, e.g., blade span length, blade twist, blade aspect ratio, airfoil characteristics such as camber and chord, and tip characteristics such as taper and sweep, may vary widely, depending upon the helicopter mission(s) and the operating performance required from the main rotor assembly in translational and/or hover flight operations.

The reconfiguration procedure for the preferred embodiment of the mid-beam jointed reconfigurable BMR assembly of the present invention is initiated by removing the lower access panel to provide access to the reconfiguration joint via the access aperture. Next, the horn segment is mechanically uncoupled from the composite torque tube 43.

The attachment bolts of the reconfiguration joint may then be removed by countertorquing. Finally, the combination of the composite torque tube, the torsion flexure member, and main rotor blade may be removed from the BMR assembly by exerting a lateral force to unsleeve the flexbeam-to-blade joint segment from the constant thickness joint segment of the flexbeam. The foregoing reconfiguration procedure is repeated for each main rotor blade of the BMR assembly.

An embodiment of a mid-beam jointed reconfigurable BMR assembly that is suitable for reconfiguration by means of the folding technique includes the basic elements and features of the BMR assembly 10 described hereinabove. The torque tube subassembly for this embodiment, however, is modified to accommodate reconfiguration of the BMR assembly by means of the folding technique. The access means of the torque tube subassembly comprises a removable splice tube that forms the inboard segment of the composite torque tube. The removable splice tube functions as an interactive intermediate interface structure for securing the composite torque tube in combination with the horn segment by means of conventional mechanical connections.

The reconfiguration procedure for the folding embodiment of the mid-beam jointed reconfigurable BMR assembly is initiated by mechanically uncoupling the removable splice tube from the horn segment and the composite torque tube. A lateral force may then be exerted to translate the removable splice tube in an outboard direction to expose the reconfiguration joint. One of two attachment bolts of the reconfiguration joint is then removed by countertorquing. The combination of the composite torque tube, the torsion flexure member, and main rotor blade may then be folded about the pivot point formed by the remaining attachment bolt. The foregoing reconfiguration procedure is repeated as necessary for the remaining main rotor blades of the BMR assembly. By properly orientating the BMR assembly prior to initiating the reconfiguration procedure, it is possible to minimize the number of folding operations inasmuch as one aftwardly extending main rotor blade need not be reconfigured.

One advantage of the mid-beam jointed reconfigurable BMR assemblies described hereinabove may not be readily apparent. In light of the short radial extension of the flexbeams, access to the reconfiguration joints to implement the reconfiguration procedure may be accomplished by means of workplatforms built into the helicopter. This greatly facilitates the reconfiguration procedure, and eliminates the need to utilize separate workplatforms.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 1 illustrates an exemplary flexbeam embodiment of a prior art bearingless main rotor assembly.

FIG. 2 illustrates an exemplary crossbeam embodiment of a prior art bearingless main rotor assembly.

FIG. 4A is a partial top plan view of the BMR assembly of FIG. 3.

FIG. 4B is cross-sectional view of the BMR assembly of FIG. 4A taken along line B—B.

FIG. 10A is a partial top plan view of another embodiment of a mid-beam jointed reconfigurable BMR assembly according to the present invention.

FIG. 10B is a cross-sectional view of the BMR assembly of FIG. 10A taken along line B—B.

DETAILED DESCRIPTION OF PREFERRED EMBODIMENTS

Figure 3:
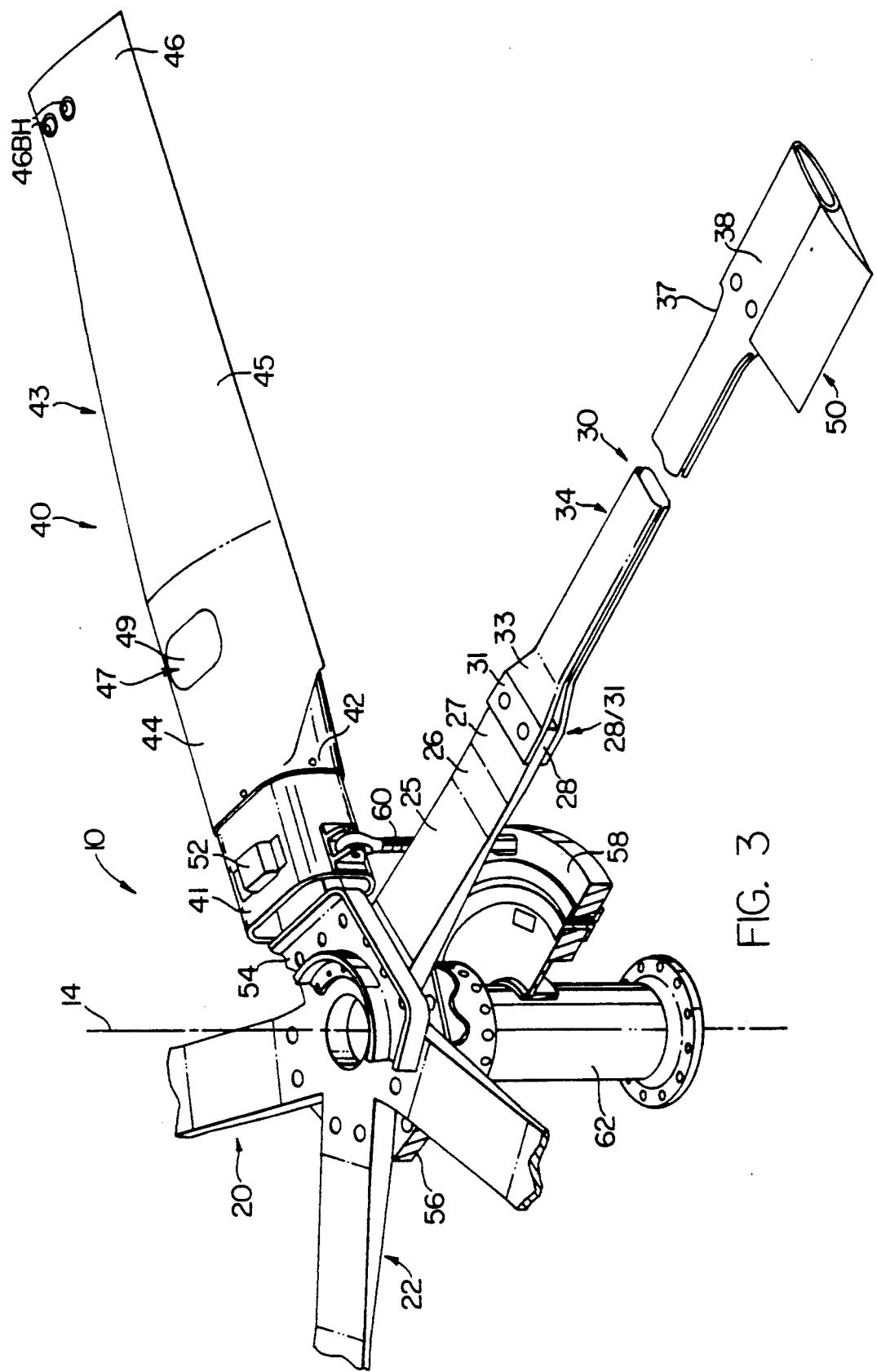
FIG. 3 is a partial, perspective view of the preferred embodiment of a mid-beam jointed reconfigurable bearingless main rotor (BMR) assembly according to the present invention.

Referring now to the drawings wherein like reference numerals identify corresponding or similar elements throughout the several views, FIGS. 3, 4A, 4B illustrate the preferred embodiment of a mid-beam jointed reconfigurable bearingless main rotor (BMR) assembly 10 according to the present invention. This preferred embodiment is the preliminary design configuration of the BMR assembly for the RAH-66 ° Comanche helicopter (not shown). It is a five-bladed bearingless main rotor assembly wherein bearings have been eliminated from centrifugal loadpaths and wherein blade flapwise and chordwise loads are reacted through out-of-plane and in-plane flexure of integral composite flexbeams. Torsional loads are accommodated by means of composite torsion flexure members that provide the interactive interface structure between the composite flexbeams and corresponding main rotor blades. The configuration of the BMR assembly 10 illustrated in FIGS. 3, 4A, 4B facilitates relatively rapid and easy reconfiguration, i.e., removal, of the helicopter blades, as described hereinbelow in further detail, to reduce the lateral/longitudinal structural envelope of the RAH-66 helicopter (see FIG. 9) for rapid deployment (for example, in C-130 or C-141 aircraft), routine transport, and/or storage thereof.

The mid-beam jointed reconfigurable BMR assembly 10 includes a PENTAFLEXTM TM (trademark of the Sikorsky Aircraft Division of United Technologies Corporation) hub structure 20 coaxially disposed with respect to the axis of rotation 14 of the BMR assembly 10, torsion flexure members 30 and main rotor blades 50 disposed in combination with the hub structure 20, torque tube subassemblies 40 disposed in combination with the hub structure 20 and respective torsion flexure member 30, main rotor blade 50 combinations, snubber dampers 52 disposed in combination with the hub structure 20 and the torque tube subassemblies 40, an upper clamp plate 54, a lower hub plate 56, a swashplate subassembly 58, pitch control rods 60, and a static rotor mast 62. The static rotor mast 62 houses the main rotor drive shaft MRDS (see FIG. 4B) and is operative to transmit main rotor assembly loads and moments into the helicopter fuselage (the gusset structure and transmission deck via a BMR assembly support truss for the RAH-66 helicopter embodiment). The swashplate subassembly 58 in combination with the pitch control rods 60 implements pitch input changes commanded by the pilot in the main rotor blades 50 via the torque tube subassemblies 40.

The snubber dampers 52 are operative to maintain the flatwise position of the torque tube subassemblies 40 relative to the respective flexbeams of the PENTAFLEX TM hub structure 20. The snubber dampers 52 are also operative to provide lead-lag damping to ensure stability of the BMR assembly 10, and to accommodate a virtual pitch hinge. The inboard location of the snubber dampers 52 results in a smaller Delta 3 that minimizes pitch/flap coupling. With a large Delta 3, large flapwise loads cause pitch changes in the main rotor blades such that the main rotor assembly operation is sluggish, i.e., counteracts cyclic inputs.

Two snubber dampers 52 are utilized for each main rotor blade 50 of the BMR assembly 10, each snubber damper 52 being disposed intermediate corresponding surfaces of a respective flexbeam and torque tube subassembly 40, as shown more clearly in FIG. 4B. A representative example of the configuration, disposition, and function of a snubber damper for a helicopter main rotor assembly is illustrated and described in U.S. Pat. No. 4,244,677.

The upper clamp plate 54 is operative to secure the PENTAFLEX TM hub structure 20 to the lower hub plate 56 by means of bolts 55 passing through the upper clamp plate 54, the hub structure 20, and the lower hub plate 56. For the RAH-66 helicopter embodiment, only two-thirds of such bolts 55 are mechanically coupled through the hub structure 20, the remaining bolts 55 providing a direct mechanical connection between the upper clamp plate 54 and the lower hub plate 56. This arrangement provides mechanical redundancy so that, in the event of a single bolt failure, the remaining bolts 55 coact to maintain normal operation of the BMR assembly 10. In prior art bolt-connected main rotor assemblies, in contrast, a single bolt failure could result in a folding action, i.e., pivoting movement about the remaining bolt, of the affected main rotor blade. The remaining connection bolt may also have been unable to safely accommodate the centrifugal loading experienced by the main rotor assembly. The upper clamp plate 54 is secured in combination to the main rotor drive shaft MRDS (see FIG. 4B) to transmit torque therefrom to the hub structure 20.

Figures 5, 5A:
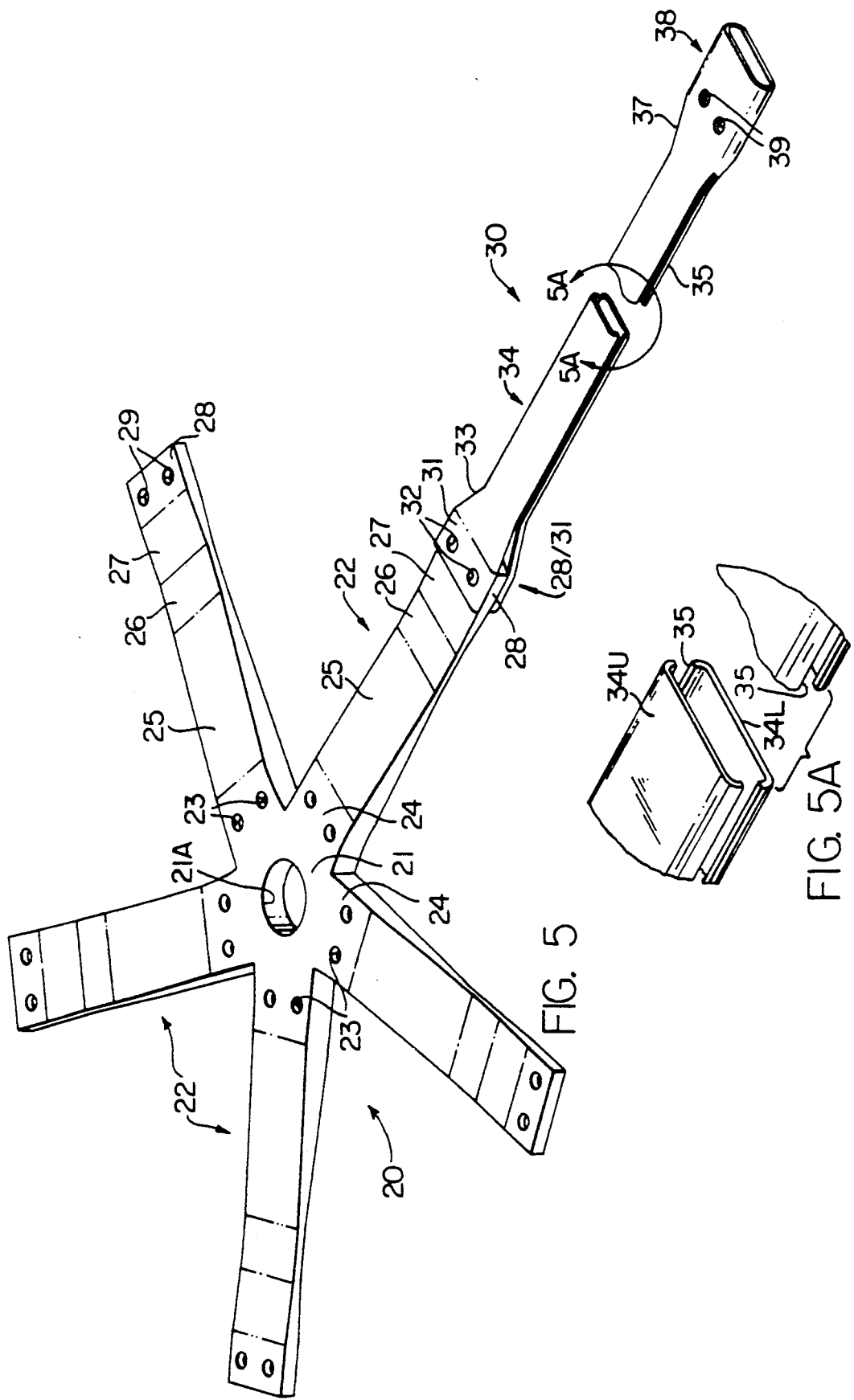
FIG. 5 is a partial, perspective view of the hub structure of the BMR assembly of FIG. 3.
FIG. 5A is an exploded, sectioned view of the torsion flexure member of the hub structure of FIG. 5.

The PENTAFLEX TM hub structure 20 is more clearly illustrated in FIG. 5 and is a unitary composite structure that includes a central hub portion 21 having a central aperture 21A coaxially orientated with respect to the axis of rotation 14 and plurality of flexbeams or legs 22 equidistantly spaced circumferentially about the central hub portion 21 and extending radially outwardly therefrom. For the RAH-66 helicopter embodiment illustrated, the hub structure 20 has five flexbeams 22 equidistantly spaced circumferentially about the central hub portion 21, i.e., about 72° spacing between radial centerlines of adjacent flexbeams 22. Bolt holes 23 are drilled in the flexbeams 22 at the constant thickness inboard segments 24 thereof, the inboard segments 24 comprising integral, radial extensions of the central hub portion 21 as described hereinbelow in further detail. The bolt holes 23 are utilized to secure the central hub portion 21 of the hub structure 20 in combination with the upper clamp plate 54 and the lower hub plate 56 by means of the bolts 55 as described in the preceding paragraph.

The flexbeams 22 have a rectangular, cross-sectional configuration at any radial station (RSTA) along the span length thereof (spanwise constant width) that facilitates the manufacture of the PENTAFLEX TM hub structure 20. Each flexbeam 22 has an integral configuration that includes, in addition to the constant thickness inboard segment 24, an inboard tapered segment 25, an intermediate segment 26 of constant minimum thickness, an outboard tapered segment 27, and a constant thickness joint segment 28, as illustrated in FIG. 5. For the preferred embodiment of the BMR assembly 10 for the RAH-66 helicopter, the inboard tapered segment 25 has a span length of about 406 mm (between RSTA 254 and RSTA 660), the intermediate segment 26 has a span length of about 77 mm (between RSTA 660 and RSTA 737), the outboard tapered segment 27 has a span length of about 126 mm (between RSTA 737 and RSTA 863), and the joint segment 28 has a span length of about 102 mm (between RSTA 863 and RSTA 965). Each joint segment 28 has bolt holes 29 formed therethrough (at RSTA 914 for the RAH-66 helicopter embodiment) for integrating respective torsion flexure member 30, main rotor blade 50 combinations with the PENTAFLEX TM hub structure 20, as described hereinbelow in further detail.

The PENTAFLEX TM hub structure 20 is operative to react radial loads resulting from the main rotor blade centrifugal forces. Full length, unidirectional high tensile strength fibers form the flexbeams 22 and the central hub portion 21, i.e., the fibers comprising any particular flexbeam 22 extend through the central hub portion 21 to form sections of the pair of substantially diametrically opposed flexbeams 22. Centrifugal loads of any main rotor blade 50 are reacted by such fibers and transmitted through the central hub portion 21 of the hub structure 20 to the pair of substantially diametrically opposed flexbeams 22 by means of such continuous fibers. This configuration of the hub structure 20 minimizes centrifugal loading reaction at the bolts 55 of the corresponding inner bolt holes 23 of each flexbeam 22. Due to the high tensile strength capacity of the flexbeams 22 as a result of the full length, unidirectional high tensile strength fibers comprising the flexbeams 22, the flexbeams 22 of the hub structure 20 of the present invention are capable of withstanding substantial centrifugal loading.

The configuration of the flexbeams 2 is stress-optimized to react flapwise and chordwise loadings due to aerodynamic forces experienced by the main rotor blades 50. The intermediate segments 26 of constant minimum thickness are comprised primarily of unidirectional, high tensile strength fiber plies that react most flapwise and some chordwise loading. This structural configuration of the flexbeams 22 results in a BMR assembly 10 having a moderately high hub offset, which for the RAH-66 helicopter embodiment illustrated, having an intermediate segment 26 of about 15 mm thickness and a length of about 77 mm (from about RSTA 660 mm to about RSTA 737 mm), is about 9%. A BMR assembly 10 having such a moderately high hub offset provides a high degree of maneuver agility while avoiding high loading of the BMR assembly 10, and minimizing wind gust sensitivity during hover flight operations.

In addition, the full length, unidirectional high tensile strength fibers forming the PENTAFLEX TM hub structure 20 exhibit a benign failure mode that enhances the overall utility of the BMR assembly 10 of the present invention. Delamination is the most probable breakdown mechanism for the hub structure 20 due to high interlaminar shear stresses experienced by the hub structure 20 during flight operations. Such a breakdown mechanism is readily detectable by periodic visual inspection, thus effectively negating the likelihood of catastrophic failure of the hub structure 20. Furthermore, the composite construction of the hub structure 20, in particular, the use of full length, unidirectional high tensile strength fibers, provides the advantage of ballistic survivability.

Further details regarding the configuration and characteristics of the PENTAFLEX TM hub structure 20, and in particular, the method of fabricating the hub structure 20 from full length, unidirectional high tensile strength fiber plies, taper plies, and filler plies of fibrous materials such as fiberglass, graphite, or KEVLAR TM (registered trademark of E.I. du Pont de Nemours & Co.) may be found in commonly-owned, co-pending U.S. patent application Ser. No. 07/641,237, filed Jan. 15, 1991, entitled A UNITARY, MULTI-LEGGED HELICOPTER ROTOR FLEXBEAM MADE SOLELY OF COMPOSITE MATERIALS AND THE METHOD OF MANUFACTURING SAME, which is incorporated herein by reference.

Figure 6:
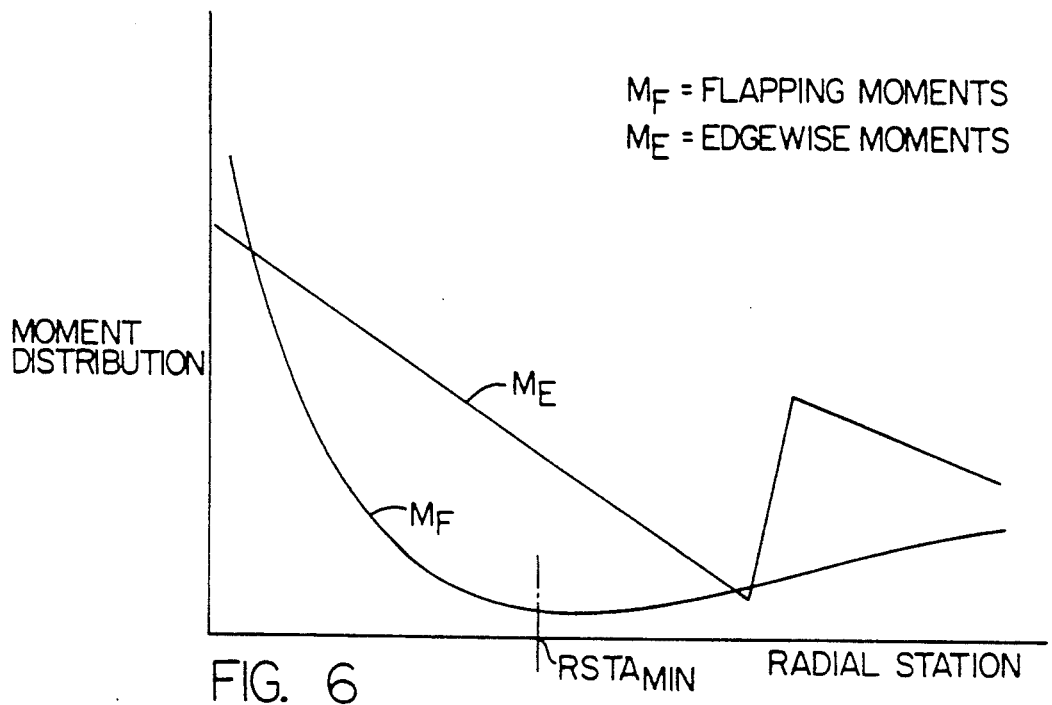
FIG. 6 is a graph illustrating the flapwise and chordwise moment distributions for a helicopter BMR assembly.

The joint segments 28 of the PENTAFLEX TM hub structure 20 of the BMR assembly 10 that comprise the reconfiguration joints are located a predetermined radial spanwise distance from the axis of rotation 14. With reference to FIG. 6, the midpoint of each joint segment 28 is purposefully located at the radial spanwise station $RSTA_{MIN}$ that is subjected to only about 5% of the flapwise bending loads (with respect to the hub plates 54, 56). This location of the joint segments 28 minimizes the structural strength, i.e., weight, required of the joint segments 2 since the minimal flapwise loading at this location allows fabrication of lighter weight joint segments 28. In contrast, joint segments formed at more inboard or outboard locations where flapwise loading is significantly higher would, by necessity, weigh more to account for the increased structural strength required. For the BMR assembly 10 of the RAH-66 helicopter embodiment, the $RSTA_{MIN}$ of the joint segment 28 midpoints is located at about RSTA 914, i.e., 914 mm in the radial spanwise direction from the axis of rotation 14. This represents about a 15% spanwise radial station, as opposed to prior art outboard reconfiguration joints (FIG. 2 embodiment) which are located at about the 25% spanwise radial station.

Manufacturing constraints and logistical considerations preclude extending the joint segments 28 of the PENTAFLEX TM hub structure 20 beyond a spanwise location greater than about 15% of the overall BMR assembly 10 span (which for the RAH-66 helicopter embodiment is about 11.9 meters). Exceeding the 15% spanwise location would result in a main rotor assembly that could not be reconfigured for rapid deployment or transport in a C-130 or C-141 aircraft, i.e., the overall diameter or lateral/longitudinal structural envelope of the helicopter rotor hub structure would not be compatible with the cargo bay dimensions of the aircraft. In addition, exceeding the 15% spanwise location would result in a main rotor assembly having functionally degraded aerodynamic characteristics. The torsion flexure members would have a decreased span length that would impair reaction to torsion loads, and/or the main rotor blades would be aerodynamically shortened, which would degrade the overall aerodynamic performance of the main rotor assembly.

Figure 9:
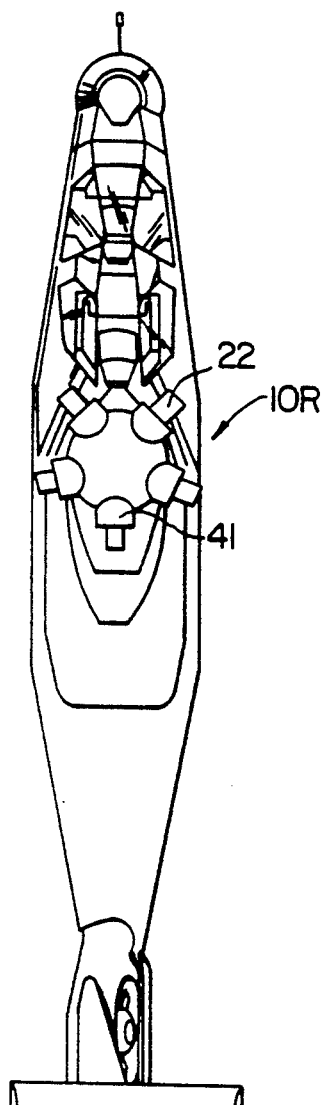
FIG. 9 is a top plan view depicting the lateral/longitudinal structural envelope of a helicopter reconfigured by means of the removal technique.

The overall diameter of the PENTAFLEX TM hub structure 20 for the RAH-66 helicopter embodiment described in the preceding paragraphs, in the blade removed configuration, is about 1.93 m (6⅜ ft), which makes the lateral/longitudinal structural envelope of the RAH-66 helicopter, as reconfigured, readily compatible with C-130 or C-141 aircraft cargo bays (see FIG. 9). An aerodynamically equivalent main rotor assembly formed of integral composite crossbeams as described hereinabove (outboard reconfiguration joint embodiment of FIG. 2), in contrast, would have an overall diameter of about 3.66 m (12 ft) when reconfigured by means of the removal technique.

Referring to FIGS. 3, 5, 5A, each torsion flexure member 30 is an integral composite structure formed from composite fiber plies having predetermined fiber orientations such that the flexure torsion member 30 exhibits low torsional stiffness. For the preferred embodiment of the BMR assembly 10 for the RAH-66 helicopter, the torsion flexure member 30 is formed of approximately seventy-five percent 0-degree fiber plies, i.e., radially unidirectional, and twenty-five percent biased fiber plies, e.g., $+/-45°$ degrees, throughout its cross-sectional thicknesses in the spanwise direction.

For the preferred embodiment of the BMR assembly 10 for the RAH-66 helicopter, each torsion flexure member 30 is an integral extension of the composite spar of the corresponding main rotor blade 50, as exemplarily illustrated in FIGS. 3, 4A, 4B. Forming the torsion flexure members 30 as integral extensions of the main rotor blade 50 composite spars simplifies the manufacturing process for the torsion flexure members 30 since each torsion flexure member 30 is comprised of unidirectional fiber plys that extend from the outboard end of the main rotor blade 50 composite spar to the inboard end of the torsion flexure member 30.

While the preferred embodiment of the torsion flexure member 30 as described herein is an integral extension of the composite spar of the corresponding main rotor blade 50, one skilled in the art will appreciate that the torsion flexure members 30 may also be fabricated as independent composite structural members. Such torsion flexure members 30 may be integrated in combination with the respective main rotor blades 50 utilizing interface techniques known to those skilled in the art.

Each torsion flexure member 30 comprises a flexbeam-to-blade joint segment 31, a first taper segment 33, a torsion segment 34, a second taper segment 37, and a torque tube joint segment 38. For the preferred embodiment of the BMR assembly 10 for the RAH-66 helicopter, the flexbeam-to-blade joint segment 31 has a span length of about 126 mm (from about RSTA 863 to about RSTA 965) and includes bolt holes 32 (at about RSTA 914), the first taper segment 33 has a span length of about 102 mm (from about RSTA 965 to about RSTA 1067), the torsion segment 34 has a span length of about 990 mm (from about RSTA 1067 to about RSTA 2057), the second taper segment 37 has a span length of about 51 mm (from about RSTA 2057 to about RSTA 2108), and the torque tube joint segment 38 has a span length of about 102 mm (from about RSTA 2108 to about RSTA 2210) and includes bolt holes 39 (at about RSTA 2159).

Each flexbeam-to-blade joint segment 31 has a clevis-shaped configuration that complements the configuration of the constant thickness joint segments 28 of the flexbeams 22. Each torsion flexure member 30, main rotor blade 50 combination is secured to the respective flexbeam 22 by sleeving the flexbeam-to-blade joint segment 31 onto the constant thickness joint segment 28 and inserting attachment bolts 15 through respective bolt holes 29, 32. The constant thickness joint segment 28, flexbeam-to-blade joint segment 31 combination comprises the reconfiguration joint 28/31 of the midbeam jointed reconfigurable BMR assembly 10 of the present invention.

The attachment bolts 15 of the reconfiguration joint are sized and configured to react the centrifugal loads developed in the BMR assembly 10. The attachment bolts 15 are secured by means of nuts 16, as illustrated in FIG. 4B. Preferably, the nuts 16 are captured nuts, that is, the nuts 16 are permanently secured to the joint segment 31, as more clearly shown in FIG. 8, as this facilitates the reconfiguration procedure described in further detail hereinbelow.

The torsion segment 34 of the torsion flexure member 30 functions as the reaction element for the torsion loads of the BMR assembly 10. The preferred configuration for the torsion segment 34 of the preferred embodiment of the BMR assembly 10 is a twin "C" composite configuration as illustrated generally in FIG. 5, and in further detail in FIG. 5A. The generally elliptical configuration of the integral extension of the main rotor blade 50 composite spar that forms the torsion flexure member 30 is "sliced" horizontally, as illustrated by reference numeral 35, to form twin "C" beams 34U, 34L that comprise the torsion segment 34 of the torsion flexure member 30. The twin "C" composite torsion segment 34 has a low torsional stiffness and functions as a natural torsion section that experiences reduced torsion induced strains due to the twin "C" configuration. In addition, the twin "C" composite torsion segment 34 provides minimum chordwise stiffness and enhanced ballistic survivability and fail safety due to the redundant load paths provided by the twin "C" beams 34U, 34L that comprise the torsion segment 34.

As alternative embodiments, the composite torsion section 34 may be fabricated in other configurations that exhibit low torsional stiffness such as a cruciform configuration, a back-to-back "C" configuration, a channel configuration, an "H" configuration, or a triple "H" configuration. These alternative embodiments may be more appropriate for utilization in BMR assemblies wherein the torsion flexure members 30 are manufactured as independent composite structural members, and subsequently integrated in combination with corresponding main rotor blades 50.

The primary function of the torque tube subassembly 40 is the transmission of pitch inputs from the corresponding pitch control rod 60 to the corresponding main rotor blade 50. To accomplish this function, the torque tube subassembly 40 is structurally configured to have a high torsional stiffness that provides precise pitch control displacement of the respective main rotor blade 50 in response to inputs from the corresponding pitch control rod 60. In addition, the torque tube subassembly 40 should have a high chordwise stiffness to facilitate transfer of chordwise loads to the respective snubber dampers 52. The torque tube subassembly 40 should also have an aerodynamic configuration such that each torque tube subassembly 40 contributes to the aerodynamic lift generated by the BMR assembly 10. Each torque tube subassembly 40 is also configured to react compressive centrifugal forces induced by the weight of the torque tube subassembly 40 and main rotor blade 50 droop and flap stop loads.

One embodiment of a torque tube subassembly 40 for the preferred embodiment of the BMR assembly 10 is illustrated in FIGS. 3, 4A, 4B. The illustrated torque tube subassembly 40 is a hybrid metallic, composite structure that includes a metallic horn segment 41 and a composite torque tube 43. The horn segment 41 is a short section of the torque tube subassembly 40 fabricated from a metallic material such as aluminum that can absorb droop stop loads and accommodate built-in step twist. The horn segment 41 integrates the functions of the inboard torque tube subassembly 40, the pitch control rod 60 attachment lugs, snubber damper 52 attachment points, and droop/flap stop surfaces into a single structure. Pitch inputs from the respective pitch control rod 60 are mechanically coupled to the horn segment 41.

Figure 8:
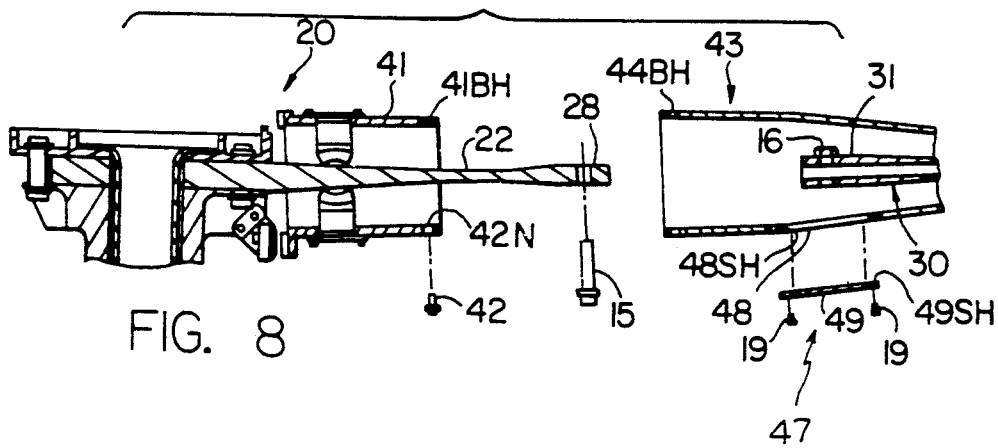
FIG. 8 depicts the reconfiguration procedure for the BMR assembly of FIG. 3 utilizing the removal technique.

As shown in FIG. 8, the outboard end of the horn segment 41 includes a plurality of peripheral bolt holes 41BH for securing the horn segment 41 and the composite torque tube 43 in combination by means of attachment bolts 42. The bolts 42 are secured by means of nuts 42N. Preferably, the nuts 42N are captured nuts that are permanently secured to the inside surface of the horn segment 41, as such an arrangement facilitates the reconfiguration process. A bonded fibrous overwrap may be utilized to prevent chafing at the horn segment 41, composite torque tube 43 interface.

The composite torque tube 43 includes an inboard segment 44, an intermediate segment 45, and an outboard segment 46. The inboard segment 44 is configured to be mated in combination with the horn segment 41 and includes a plurality of corresponding peripheral bolt holes 44BH for securing the horn segment 41 in combination with the composite torque tube 43. The outboard segment 46 includes aligned bolt holes 46BH for securing the outboard end of the torque tube subassembly 40 in combination with the respective torsion flexure member 30, main rotor blade 50 combination by means of bolts 18 inserted through the bolt holes 39, 46BH of the torque tube joint segment 38 and the outboard segment 46, respectively. This combination of elements effectuates the transfer of pitch inputs from the torque tube subassembly 40 to the corresponding main rotor blade 50.

The composite torque tube 43 also includes means 47 for accessing the reconfiguration joint 28/31 described hereinabove to implement the reconfiguration procedure (described hereinbelow), as illustrated in FIG. 8. The access means 47 for the BMR assembly 10 of the RAH-66 helicopter embodiment includes lower and/or upper access apertures 48 formed in corresponding dorsal and/or ventral walls of the composite torque tube 43 in alignment with the reconfiguration joint 28/31, peripheral screw holes 48SH formed in the walls of the composite torque tube 43 adjacent the access aperture(s) 48, and corresponding access cover panels 49 having a plurality of peripheral screw holes 49SH. The access cover panels 49 are detachably secured over corresponding access apertures 48 by means of screws 19 threaded into the corresponding screw holes 48SH, 49SH.

Each composite torque tube 43 is an integral composite structure comprised of multiple layers of fibrous tension-wound filaments, wraps, and/or laminates wherein the shape and fiber orientations thereof vary along the span length of the composite torque tube 43 to provide a composite torque tube 43 having a configuration based upon the torsional stiffness, buckling strength, and fatigue strength design constraints of the BMR assembly 10. The inboard and outboard segments 44, 46 of the composite torque tube 43 are of generally constant oval shape and are thicker in cross section than the intermediate segment 45. The inboard and outboard segments 44, 46 are formed of tension-wound filaments and fibrous wraps and laminates having 0°, +/−45°, and/or 90° fiber orientations to react hoop stresses and loading through the respective bolted connections provided by the bolt holes 44BH, 46BH of the inboard and outboard segments 44, 46, respectively, of the composite torque tube 43.

The intermediate segment 45 has a constant wall thickness and is of oval cross section that is tapered in the spanwise direction, inboard to outboard. The intermediate segment 45 may be formed with tension-wound filaments having a +/−45° fiber orientation that provides maximum torsional stiffness. Alternatively, the intermediate segment 45 may be formed with fibrous laminates having a 0° fiber orientation and tension-wound filaments having a +/−45° fiber orientation.

Figure 7:
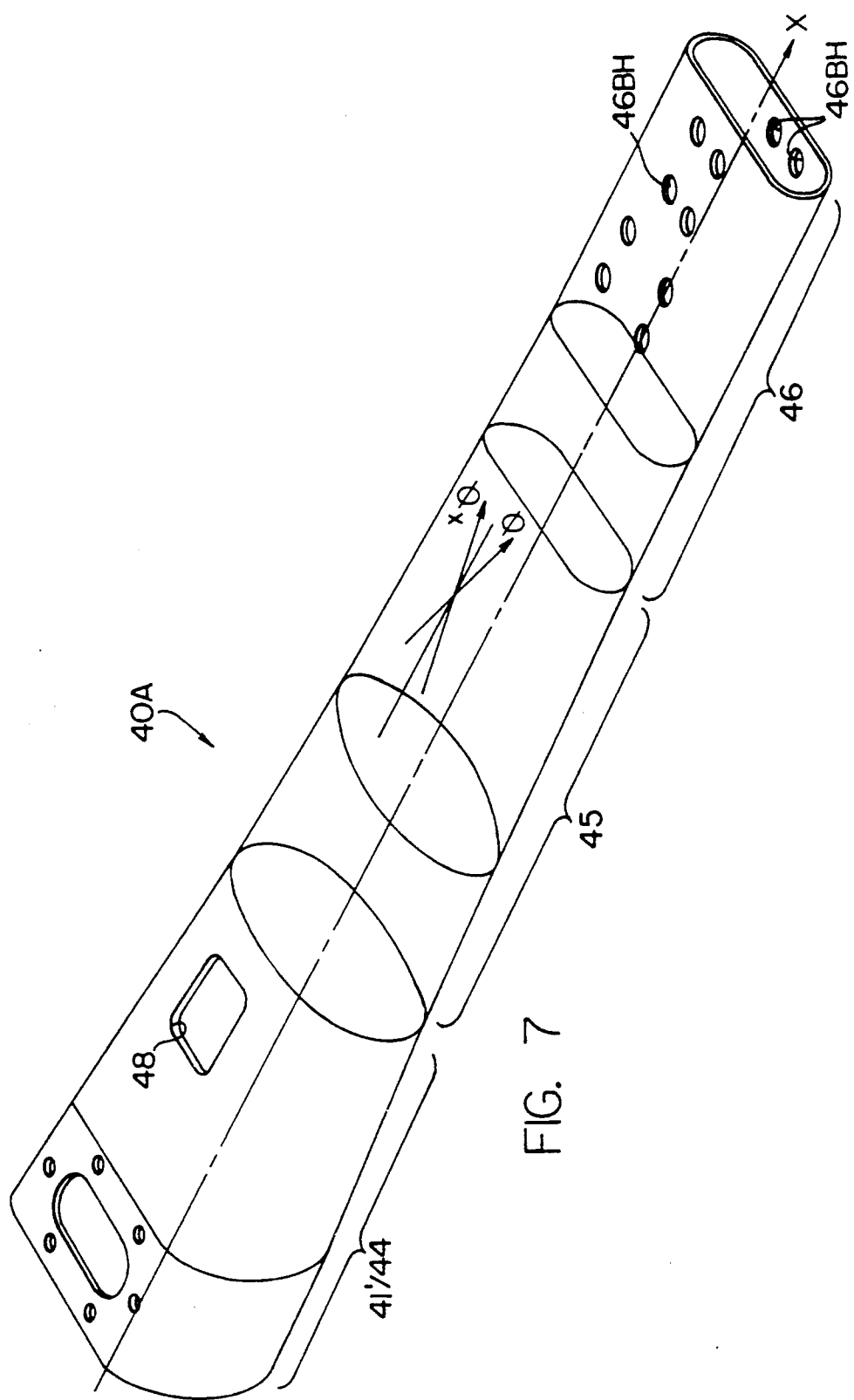
FIG. 7 is a perspective view of an all-composite embodiment of a torque tube subassembly for use in the BMR assembly of the present invention.

Another embodiment of a torque tube subassembly 40A which has particular utility in the preferred embodiment of the BMR assembly 10 according to the present invention is illustrated in FIG. 7 and further described and claimed in commonly-owned, co-pending U.S. patent application Ser. No. 07/751,272, filed Aug. 28, 1991, entitled BEARINGLESS MAIN ROTOR ASSEMBLY TORQUE TUBE, which is hereby incorporated herein by reference. The torque tube subassembly 40A is a totally composite structure that is optimally fabricated to meet the torsional stiffness, fatigue strength, and buckling strength design constraints of the BMR assembly 10 at minimal weight.

The all-composite torque tube subassembly 40A includes a strengthened inboard section 41'/44 for mechanically coupling the torque tube subassembly 40A in combination with the PENTAFLEX TM hub structure 20 as well as providing attachment points for the snubber dampers 52 and the pitch control rod 60, a strengthened outboard section 46 for mechanically coupling the torque tube subassembly 40A in combination with the corresponding torsion flexure member 30, main rotor blade 50 combination, and an intermediate section 45 that is operative to accommodate the pitch, flapwise, and/or edgewise loads acting on the BMR assembly 10.

The inboard section 41'/44 is optimally fabricated to include tension-wound filaments having a 90° fiber orientation to react induced hoop stresses and fibrous laminates having a +/−45° fiber orientation to accommodate bearing loads. The outboard section 46 is optimally fabricated to include fibrous laminates having a 0° fiber orientation to accommodate connection loading and fibrous laminates having a +/−45° fiber orientation to accommodating load transfers between the torque tube subassembly 40A and the hub structure 20.

The intermediate section 45 has a constant wall thickness formed from continuous filament windings having a predetermined fiber orientation within the range of about +/−18° to about +/−40° and/or a range of about +/−26° to about +/−35°. The intermediate section 45 of the torque tube subassembly 40A is preferably formed from continuous filament windings having a +/−35° fiber orientation to provide an intermediate section 45 having minimal torque tube wall thickness, i.e., a torque tube subassembly 40A having minimal overall unit weight. The continuous filament windings having the +/−35° fiber orientation in the intermediate section 45 can be smoothly transitioned to provide fibrous layers having a +/−45° fiber orientation in the inboard section 41'/44 to enhance the structural strength thereof without the addition of ancillary fibrous layers having the +/−45° fiber orientation.

The mid-beam jointed reconfigurable BMR assembly 10 described hereinabove is adaptable for use with a wide variety of main rotor blade 50 configurations. As one skilled in the art will appreciate, the specific aerodynamic configuration of the main rotor blade, e.g., blade span length, blade twist, blade aspect ratio, airfoil characteristics such as camber and chord, and tip characteristics such as taper and sweep, may vary widely, depending upon the helicopter mission(s) and the operating performance required from the main rotor assembly in translational and/or hover flight operations. Therefore, the main rotor blades 50 that comprise elements of the BMR assembly 50 of the present invention have not been illustrated in detail in the drawings nor described in detail in the specification. By way of example, each of the main rotor blades 50 for the RAH-66 helicopter embodiment of the BMR assembly 10 has a blade span length of about 3.7 meters, a chord of about 0.38 meters, and a blade twist of about 13°, the inboard region of such blades having a Boeing VR-12 airfoil section and the tip region having a Sikorsky SSCA09 airfoil section which includes a swept, tapered tip. As discussed hereinabove, the main rotor blades 50 for the BMR assembly 10 for the RAH-66 helicopter embodiment have composite spars to facilitate the formation of the torsion flexure members 30 as an integral element of the main rotor blades 50 for the preferred embodiment of the BMR assembly 10 described in the preceding paragraphs.

The reconfiguration procedure for the preferred embodiment of the mid-beam jointed reconfigurable BMR assembly 10 of the present invention described hereinabove is outlined in the following paragraphs with reference to FIG. 8. First, the lower access panel 49 is removed from the torque tube subassembly 40 by removing the screws 19 to provide access to the reconfiguration joint 28/31 via the access aperture 48. Next, the attachment bolts 42 securing the horn segment 41 in combination with the composite torque tube 43 are removed. The removal of the attachment bolts 42 is greatly simplified by the use of captured nuts 42N since no wrench is required to provide counterleverage during countertorquing of the attachment bolts 42.

The attachment bolts 15 of the reconfiguration joint 28/31 may then be removed by countertorquing. Once again, the use of captured nuts 16 greatly simplifies the removal of the attachment bolts 15. Finally, the combination of the composite torque tube 43, the torsion flexure member 30, and main rotor blade 50 may be removed from the BMR assembly 10 by exerting a lateral force to unsleeve the flexbeam-to-blade joint segment 31 from the constant thickness joint segment 28 of the flexbeam 22. The foregoing reconfiguration procedure is repeated for each main rotor blade 50 of the BMR assembly 10. The lateral/longitudinal structural envelope of the reconfigured BMR assembly 10R is illustrated in FIG. 9.

An embodiment of a mid-beam jointed reconfigurable BMR assembly 10' that is suitable for reconfiguration by means of the folding technique is exemplarily illustrated in FIGS. 10A, 10B. The basic elements and features of the BMR assembly 10 described hereinabove are incorporated as elements of this embodiment of the BMR assembly 10'. The torque tube subassembly for this embodiment, however, is modified as described in the following paragraph to accommodate reconfiguration of the BMR assembly 10' by means of the folding technique.

With reference to FIGS. 10A, 10B, the access means 47' of the torque tube subassembly 40' of the BMR assembly 10' comprises a removable splice tube 80. The removable splice tube 80 forms the inboard segment of the composite torque tube 43' and is further operative as the means 47' for accessing the reconfiguration joint 28/31 of the BMR assembly 10'. The removable splice tube 80 has a plurality of screw holes 81 for screws 82 along the peripheral edges thereof as illustrated in the drawings. The removable splice tube 80 functions as an interactive interface structure for securing the composite torque tube 43' in combination with the horn segment 41.

Figure 11:
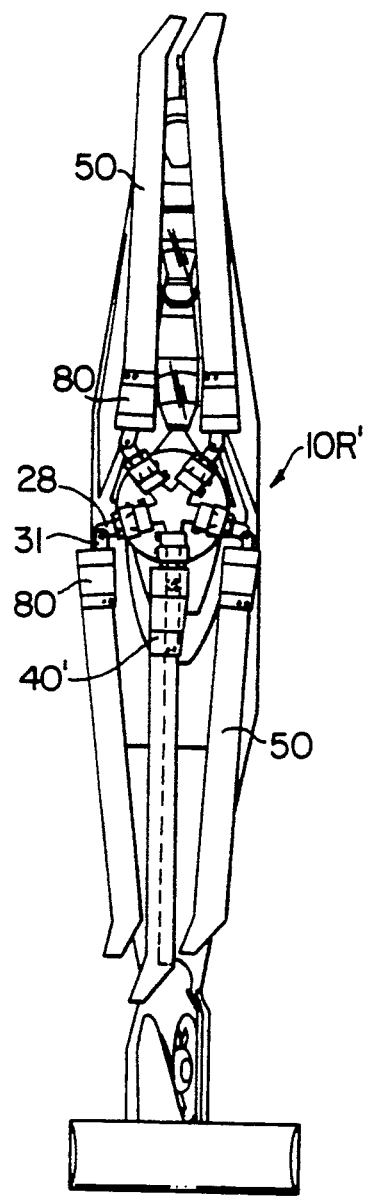
FIG. 11 is a top plan view depicting the lateral/longitudinal structural envelope of a helicopter reconfigured by means of the folding technique.

The reconfiguration procedure for the embodiment of the mid-beam jointed reconfigurable BMR assembly 10' of the present invention described hereinabove is outlined in the following paragraphs with reference to FIGS. 10A, 10B. First, the screws 82 securing the removable splice tube 80 to the horn segment 41 and the composite torque tube 43' are removed. A lateral force may then be exerted to translate the removable splice tube 80 in an outboard direction, thereby exposing the reconfiguration joint 28/31. For the reconfiguration joint 28/31 illustrated in FIG. 10A, which utilizes two attachment bolts 15, one of the two attachment bolts 15 is removed by countertorquing. The use of captured nuts 16 greatly simplifies the removal of the attachment bolt 15 since no wrench is required to provide counterleverage during countertorquing. The combination of the composite torque tube 43', the torsion flexure member 30, and main rotor blade 50 may then be folded about the pivot point formed by the remaining attachment bolt 15. The foregoing reconfiguration procedure is repeated as necessary for the remaining main rotor blades 50 of the BMR assembly 10'. The lateral/longitudinal structural envelope of the reconfigured BMR assembly 10R' is illustrated in FIG. 11. By properly orientating the BMR assembly 10' prior to initiating the reconfiguration procedure, it is possible to minimize the number of folding operations (as illustrated in FIG. 11 wherein the one aftwardly extending main rotor blade need not be reconfigured).

One advantage of the mid-beam jointed reconfigurable BMR assemblies described hereinabove may not be readily apparent. In light of the short radial extension of the flexbeams 22 as described hereinabove, access to the reconfiguration joints to implement the reconfiguration procedure may be accomplished by means of workplatforms built into the helicopter. This greatly facilitates the reconfiguration procedure, and eliminates the need to utilize separate workplatforms.

A variety of modifications and variations of the present invention are possible in light of the above teachings. The foregoing disclosure described a BMR assembly that included a unitary composite hub structure having five flexbeams. It will be appreciated that the BMR assembly of the present invention may be fabricated with any number of integral flexbeams, although a BMR assembly having an odd number of flexbeams is better adapted to the manufacturing process described in commonly-owned, co-pending U.S. patent application Ser. No. 07/641,237, filed Jan. 15, 1991, entitled A UNITARY, MULTI-LEGGED HELICOPTER ROTOR FLEXBEAM MADE SOLELY OF COMPOSITE MATERIALS AND THE METHOD OF MANUFACTURING SAME.

The mid-beam jointed reconfigurable BMR assembly described hereinabove may also be adapted for use in the bearingless main rotor assemblies described hereinabove with reference to FIGS. 1, 2. In lieu of the flexbeams and crossbeams of these prior art bearingless main rotor assemblies, the flexbeam 22, torsion flexure member 30 combination described hereinabove may be utilized.

As noted hereinabove, experience has shown that the most common failure mechanism for the flexbeams is delamination. To provide an additional margin of safety, the flexbeams may be overwrapped with crossply composite materials in critical areas. Overwrapping has been shown to provide about a thirty percent increase in flexbeam fatigue strength by reducing interlaminar shear stresses. This increase in fatigue strength, however, must be balanced against the increase in overall weight of the BMR assembly and the additional fabrication steps to provide such an overwrap, which increases the overall cost of the unitary composite hub structure. It is therefore to be understood that, within the scope of the appended claims, the present invention may be practiced otherwise than as specifically described hereinabove.

Although this invention has been shown and described with respect to detailed embodiments thereof, it will be understood by those skilled in the art that various changes in form and detail thereof may be made without departing from the spirit and scope of the claimed invention.

What is claimed is:

1. A mid-beam jointed reconfigurable bearingless main rotor assembly for a helicopter that facilitates reconfiguration of said main rotor assembly to reduce the structural envelope of the helicopter, comprising:

rotor hub structure means for providing torque for said mid-beam jointed reconfigurable bearingless main rotor assembly, said rotor hub structure means including a plurality of composite flexbeams extending radially outwardly from said rotor hub structure means and operative to react flapwise and chordwise loads experienced by said main rotor assembly;

a plurality of composite torsion flexure members, each of said plurality of composite torsion flexure members being operative to accommodate torsional loads experienced by said main rotor assembly;

a plurality of main rotor blades;

respective ones of said plurality of composite torsion flexure members and said plurality of main rotor blades forming a combination that is mechanically coupled with corresponding ones of said plurality of flexbeams; and torque tube subassembly means for transmitting pitch inputs to said plurality of main rotor blades, said torque tube subassembly means being mechanically coupled to corresponding ones of said plurality of flexbeams and said torsion flexure member, main rotor blade combinations;

each of said plurality of flexbeams being formed to include a joint segment at the outboard end thereof at a radial station where flapwise bending loads experienced by said main rotor assembly are minimal, said radial station defining said joint segment being not greater than about fifteen percent of the overall span of said main rotor assembly;

each of said plurality of torsion flexure members being formed to include a flexbeam-to-blade joint segment at the inboard end thereof that is complementary to said joint segment of said flexbeam;

respective ones of said joint segments of said plurality of flexbeams being mechanically coupled in combination with respective ones of said flexbeam-to-blade joint segments to mechanically couple respective ones of said combinations to corresponding ones of said flexbeams, each of said joint segment, flexbeam-to-blade joint segment combination defining a reconfiguration joint;

said reconfiguration joint being located at said radial station that is not greater than about fifteen percent of said overall span of the main rotor assembly;

said torque tube subassembly means including means for accessing said corresponding reconfiguration joint to mechanically decouple said reconfiguration joint for reconfiguration of said main rotor assembly to reduce the structural envelope of the helicopter, said accessing means including at least one removable access panel that is spatially aligned with said reconfiguration joint;

said torque tube subassembly means further including means for mechanically decoupling said torque tube subassembly means from said main rotor assembly to facilitate reconfiguration of said main rotor assembly to reduce the structural envelope of the helicopter.

2. The mid-beam jointed reconfigurable bearingless main rotor assembly of claim 1 wherein said mechanical decoupling means comprises a horn segment and a composite torque tube segment mechanically coupled in combination by removable attachment bolts.

3. The mid-beam jointed reconfigurable bearingless main rotor assembly of claim 2 wherein said at least one access panel is utilized to completely mechanically uncouple said reconfiguration joint and said horn segment is mechanically decoupled from said composite torque tube segment wherein said torsion flexure member, main rotor blade combination and said composite torque tube segment of said torque tube subassembly means are removable from said main rotor assembly to reduce the structural envelope of the helicopter.

4. The mid-beam jointed reconfigurable bearingless main rotor assembly of claim 1 wherein each of said plurality of main rotor blades includes a composite spar and further wherein each of said plurality of torsion flexure members is an elliptically configured integral extension of said composite spar of said corresponding main rotor blade.

5. A mid-beam jointed reconfigurable bearingless main rotor assembly for a helicopter that facilitates reconfiguration of said main rotor assembly to reduce the structural envelope of the helicopter, comprising:

rotor hub structure means for providing torque for said mid-beam jointed reconfigurable bearingless main rotor assembly, said rotor hub structure means including a plurality of composite flexbeams extending radially outwardly from said rotor hub structure means and operative to react flapwise and chordwise loads experienced by said main rotor assembly;

a plurality of composite torsion flexure members, each of said plurality of composite torsion flexure members being operative to accommodate torsional loads experienced by said main rotor assembly;

a plurality of main rotor blades;

respective ones of said plurality of composite torsion flexure members and said plurality of main rotor blades forming a combination that is mechanically coupled with corresponding ones of said plurality of flexbeams; and torque tube subassembly means for transmitting pitch inputs to said plurality of main rotor blades, said torque tube subassembly means being mechanically coupled to corresponding ones of said plurality of flexbeams and said torsion flexure member, main rotor blade combinations;

each of said plurality of flexbeams being formed to include a joint segment at the outboard end thereof at a radial station where flapwise bending loads experienced by said main rotor assembly are minimal;

each of said plurality of torsion flexure members being formed to include a flexbeam-to-blade joint segment at the inboard end thereof that is complementary to said joint segment of said flexbeam;

respective ones of said joint segments of said plurality of flexbeams being mechanically coupled in combination with respective ones of said flexbeam-to-blade joint segments to mechanically couple respective ones of said combinations to corresponding ones of said flexbeams, each of said joint segment, flexbeam-to-blade joint segment combination defining a reconfiguration joint;

said torque tube subassembly means including means for accessing said corresponding reconfiguration joint to mechanically decouple said reconfiguration joint for reconfiguration of said main rotor assembly to reduce the structural envelope of the helicopter;

said torque tube subassembly means further including means for mechanically decoupling said torque tube subassembly means from said main rotor assembly to facilitate reconfiguration of said main rotor assembly to reduce the structural envelope of the helicopter; and wherein said accessing means and said mechanical decoupling means of said torque tube subassembly means includes a removable splice tube spatially aligned with said reconfiguration joint.

6. The mid-beam jointed reconfigurable bearingless main rotor assembly of claim 5 wherein said removable splice tube is movable to permit partial mechanical uncoupling of said reconfiguration joint wherein said torsion flexure member, main rotor blade combination and said torque tube subassembly means is foldable about said reconfiguration joint to reduce the structural envelope of the helicopter.

7. The mid-beam jointed reconfigurable bearingless main rotor assembly of claim 4 wherein each said torsion flexure members includes a torsion segment comprised of twin "C" beams.

* * * * *